United States Patent
Anguiano-Wehde et al.

(10) Patent No.: US 8,508,929 B2
(45) Date of Patent: Aug. 13, 2013

(54) IMPLEMENTING ENHANCED COVER-MOUNTED, AUTO-DOCKING FOR MULTIPLE DASD CONFIGURATIONS

(75) Inventors: Nadia Anguiano-Wehde, Rochester, MN (US); Aaron M. Hegrenes, Rochester, MN (US); Seth D. Lewis, Rochester, MN (US); Thomas S. Rasmussen, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 12/939,503

(22) Filed: Nov. 4, 2010

(65) Prior Publication Data

US 2012/0113581 A1    May 10, 2012

(51) Int. Cl.
*G06F 1/16* (2006.01)
(52) U.S. Cl.
USPC ............... 361/679.33; 361/724; 361/725
(58) Field of Classification Search
USPC .................................. 361/679.33, 724–728
See application file for complete search history.

(56) References Cited

U.S. PATENT DOCUMENTS

| | | | | |
|---|---|---|---|---|
| 5,187,643 A * | 2/1993 | I-Shou | ...................... | 361/679.37 |
| 5,495,389 A * | 2/1996 | Dewitt et al. | ............ | 361/679.57 |
| 6,296,334 B1 * | 10/2001 | Liao | ............................ | 312/223.2 |
| 6,478,597 B1 * | 11/2002 | Roberts et al. | ................ | 439/260 |
| 6,781,827 B2 | 8/2004 | Goodman et al. | | |
| 7,281,953 B1 * | 10/2007 | Jochym et al. | ................ | 439/638 |
| 7,379,296 B1 * | 5/2008 | Huang | ..................... | 361/679.41 |
| 7,701,702 B2 * | 4/2010 | Chen et al. | ............... | 361/679.33 |
| 7,735,669 B2 * | 6/2010 | Liang | ........................... | 220/4.21 |
| 7,983,032 B2 * | 7/2011 | Walker et al. | ............ | 361/679.33 |

* cited by examiner

*Primary Examiner* — Hoa C Nguyen
*Assistant Examiner* — Paresh Paghadal
(74) *Attorney, Agent, or Firm* — Joan Pannington (57) ABSTRACT

An enclosure assembly and system are provided for implementing cover-mounted, auto-docking for multiple DASD configurations in information technology equipment. A user selected direct access storage device (DASD) configuration is mechanically attached to an enclosure cover. A cover interposer card is mechanically attached to the enclosure cover and electrically connected to each DASD in the user selected DASD configuration. An electrical connector mates with the cover interposer card as the cover is installed through a sliding motion with a chassis and base planar of the enclosure assembly. A flexible cable interconnect attached to the mating electrical connector is connected to the base planar. The enclosure assembly enables high density, high performance modular server architectures without compromising processor performance or planar electrical architecture.

20 Claims, 14 Drawing Sheets

IMPLEMENTING ENHANCED COVER-MOUNTED, AUTO-DOCKING FOR MULTIPLE DASD CONFIGURATIONS

FIELD OF THE INVENTION

The present invention relates generally to the data processing field, and more particularly, relates to an enclosure assembly and server system for implementing cover-mounted, auto-docking for multiple direct access storage device (DASD) configurations in information technology equipment.

DESCRIPTION OF THE RELATED ART

High-density information technology equipment (ITE) advantageously is configured to meet the customer's processing and storage requirements. Various components are provided in high-density ITE, such as blade servers, manufactured by International Business Machines Corporation. Blade servers fit in a single chassis like books in a bookshelf and each is an independent server, with its own processors, memory, storage, network controllers, operating system and applications. The blade server simply slides into a bay in the chassis and plugs into a mid-plane or backplane, sharing power, fans, switches, and ports with other blade servers.

Due to the high planar density requirements in information technology equipment, such as the Power7® server systems by International Business Machines Corporation of Armonk, N.Y., there is limited space available to place all required features and card components on a base planar.

For example, due to the large footprint required for multiple direct access storage device (DASD) configurations, placing hard disk drives (HDDs) or solid state drives (SSDs) on the base planar would drive considerable function trade-offs, for example, this could require eliminating one of the expansion cards or could require considerable performance trade-offs, such as shrinking the processor heat sink, resulting in lower performance, and the like.

A need exists for an effective enclosure assembly and system for implementing multiple DASD configurations in information technology equipment.

SUMMARY OF THE INVENTION

Principal aspects of the present invention are to provide an enclosure assembly and server system for implementing cover-mounted, auto-docking for multiple DASD configurations in information technology equipment. Other important aspects of the present invention are to provide such enclosure assembly and system substantially without negative effect and that overcome many of the disadvantages of prior art arrangements.

In brief, an enclosure assembly and system are provided for implementing cover-mounted, auto-docking for multiple DASD configurations in information technology equipment. A user selected direct access storage device (DASD) configuration is mechanically attached to an enclosure cover. A cover interposer card is mechanically attached to the enclosure cover and electrically connected to each DASD in the user selected DASD configuration. An electrical connector mates with the cover interposer card as the cover is installed through a sliding motion with a chassis and base planar of the enclosure assembly. A flexible cable interconnect attached to the mating electrical connector is connected to the base planar.

In accordance with features of the invention, the auto-docking of the electrical connector and the cover interposer card without requiring pivoting or rotation of the cover enables the use of the flexible cable interconnect having a minimized length. Alternative user connections typically would require a much longer cable length, which would introduce additional signal integrity and cable routing challenges.

In accordance with features of the invention, one common cover is used with the multiple DASD configurations. The modularity of the one common cover and chassis of the enclosure assembly enables only change is in the mounting hardware and the user sees no change in installation, alignment, or latching of the enclosure assembly.

In accordance with features of the invention, no tools are needed for cover installation or drive removal by the user.

In accordance with features of the invention, the enclosure assembly enables high density and high performance in tightly packaged information technology equipment, such as a server system used within limited available space.

In accordance with features of the invention, the enclosure assembly enables high density, high performance modular server architectures without compromising processor performance or planar electrical architecture.

In accordance with features of the invention, two hard disk drives (HDDs) or solid state drives (SSDs) are housed in SSD- or HDD-specific assemblies, each mechanically attached to an inside surface of the top cover.

In accordance with features of the invention, the customer chooses the top cover containing the disk drive assembly for a particular application. Serial attached SCSI (SAS) interface signals are routed from the user selected DASD configuration or disk drive assembly through the cover interposer card, via the flex cable, to a zero-insertion force connector mounted on the base planar.

In accordance with features of the invention, the flex cable and electrical connector is mounted to the chassis via mechanical bracket assembly to provide the auto-docking connection between interposer card and base planar. A small mechanical bracket houses the flexible cable interconnect together with the card-edge electrical connector that plugs with the cover interposer card when the cover is installed. The other end of the flex cable plugs to a zero-insertion force connector on the base planar.

In accordance with features of the invention, the cover mounted user selected DASD configuration of hard disk drives (HDDs) or solid state drives (SSDs) presents a significant space-saving advantage over arrangements that place the HDDs or SSDs on the base planar.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the drawings the same reference number are used in FIGS. 1-10B for identical or similar components or elements.

In accordance with features of the invention, an enclosure assembly and system are provided for implementing cover-mounted, auto-docking for multiple DASD configurations in information technology equipment. The cover mounted user selected DASD configuration of hard disk drives (HDDs) or solid state drives (SSDs) presents a significant space-saving advantage over arrangements that place the HDDs or SSDs on the base planar. The enclosure assembly enables high density, high performance modular server architectures enabling enhanced processor performance and efficient and effective planar electrical architecture.

Figure 1:
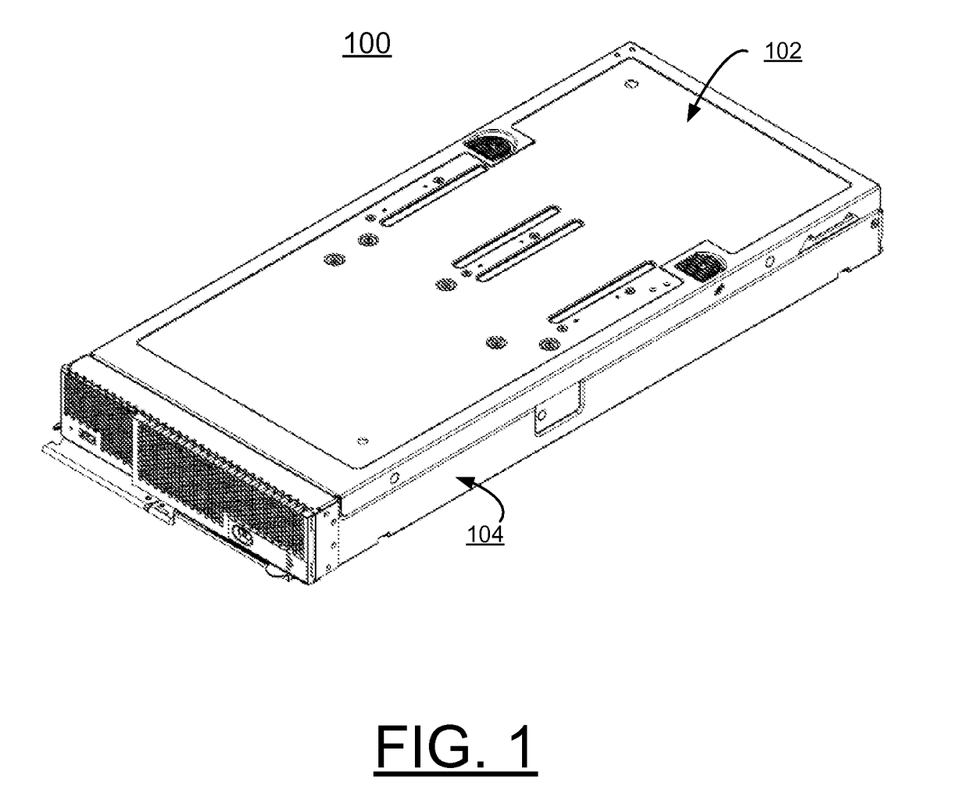
FIG. 1 is a perspective view not to scale illustrating an enclosure assembly for implementing cover-mounted, auto-docking for multiple DASD configurations in information technology equipment in accordance with the preferred embodiment.

Having reference now to the drawings, in FIG. 1, there is shown an enclosure assembly for implementing cover-mounted, auto-docking for multiple DASD configurations in information technology equipment generally designated by the reference character 100 in accordance with the preferred embodiment. Enclosure assembly 100 includes a cover generally designated by the reference character 102 and a chassis generally designated by the reference character 104.

FIG. 1 shows the cover 102 and the chassis 104 assembled together in the enclosure assembly 100. The enclosure assembly 100 having a predefined rack-mounted form factor, slides into a slot in an interconnect system rack and plugs into a backplane, for example, for connecting power supplies with power, and for connecting system ports. The cover 102 including its latching, alignment, and usability features, is a standard component of the enclosure assembly 100 for use with all the multiple user selected DASD configurations.

Figure 2:
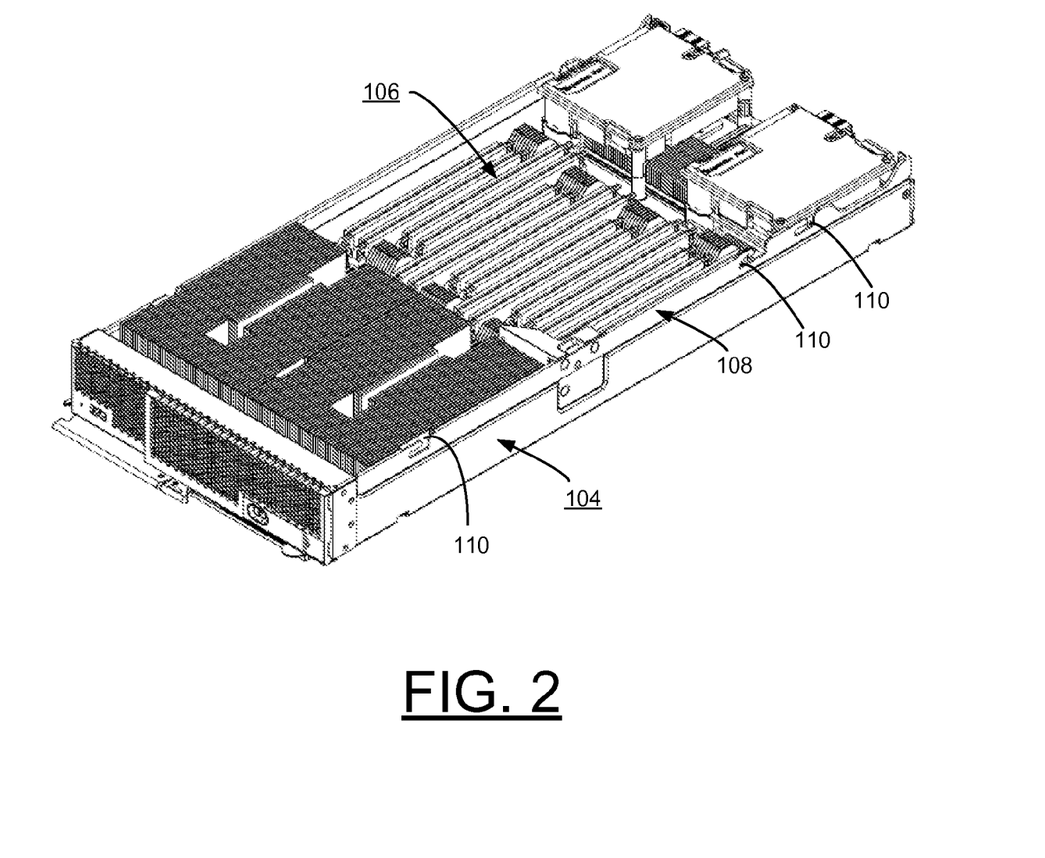
FIG. 2 is a perspective view not to scale illustrating the chassis and base planar of the enclosure assembly of FIG. 1 in accordance with the preferred embodiment.
Figure 3:
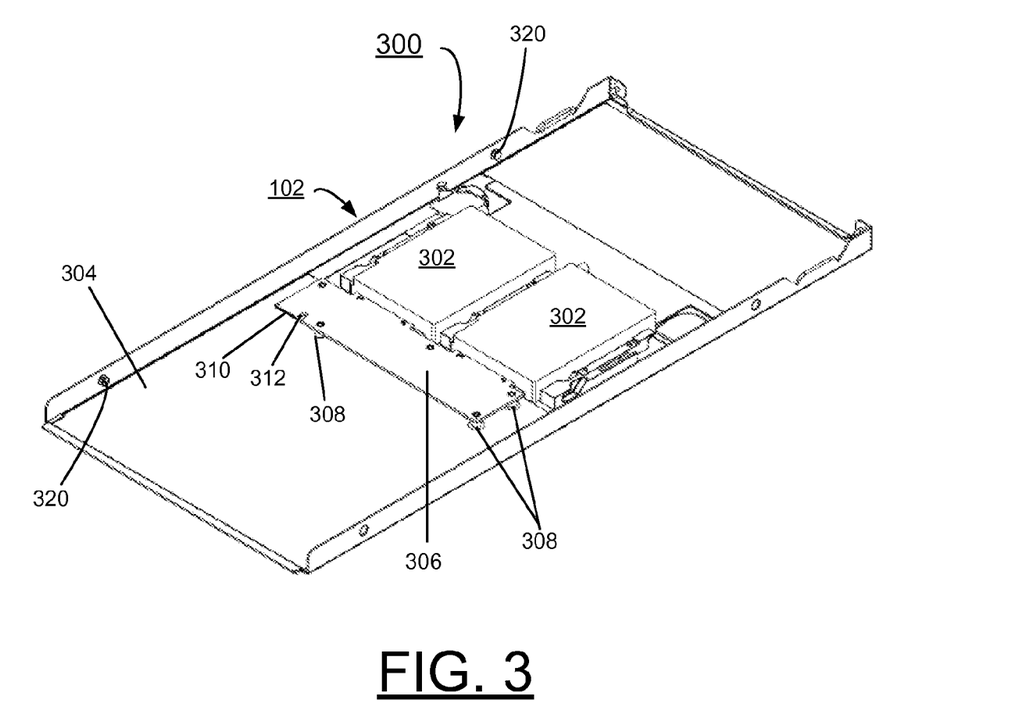
FIG. 3 is a perspective view not to scale illustrating the cover disposed upside-down with an example configuration with hard disk drives (HDDs) of the enclosure assembly of FIG. 1 in accordance with the preferred embodiment.
Figure 4:
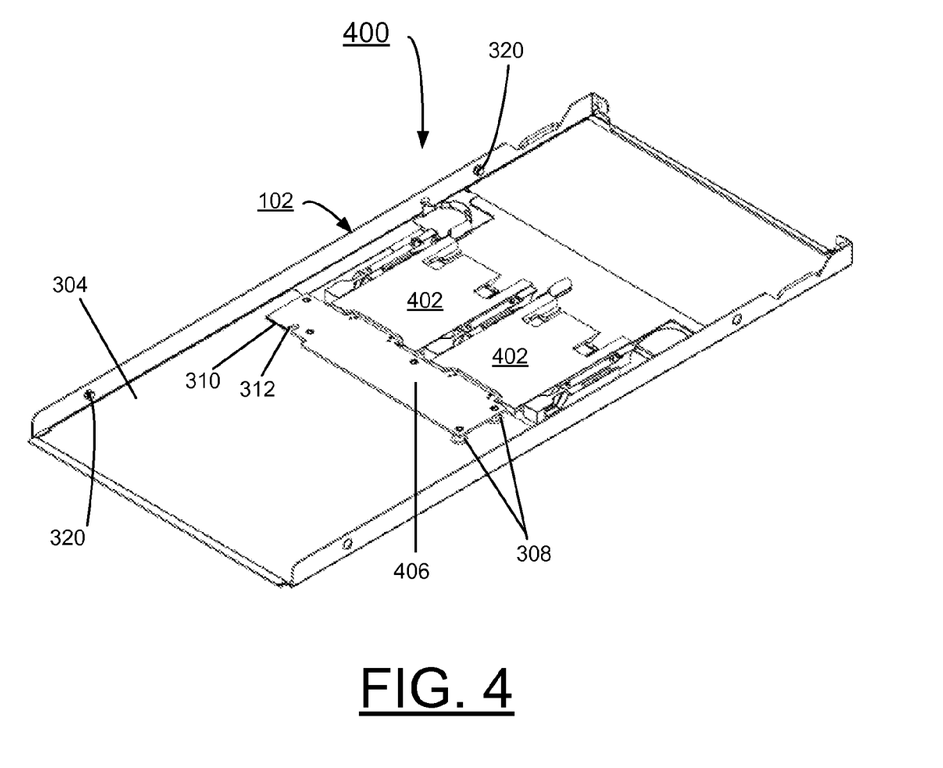
FIG. 4 is a perspective view not to scale illustrating the cover disposed upside-down with an example configuration with solid state drives (SSDs) of the enclosure assembly of FIG. 1 in accordance with the preferred embodiment.

Referring to FIG. 2, there is shown the chassis 104 together with a base planar 106 in accordance with the preferred embodiment of the enclosure assembly 100 with the cover 102 removed. The chassis 104 includes an upper ledge 108 for sliding engagement with the cover 102 in the enclosure assembly 100. A plurality of mating latching features 110 are provided on the upper ledge 108 for mating latching engagement with corresponding latching features 320 of the cover 102 as shown in FIGS. 3, 4, 8A, 8B, 10A, and 10B. The enclosure assembly 100 includes for example, a high performance server with processor modules, integrated virtual Ethernet (IVE) daughter cards, and the like included with the base planar 106, which is carried by the chassis 104. A user selected multiple DASD configuration is carried by the cover 102, for example, as shown in FIGS. 3 and 4.

FIG. 3 is a perspective view not to scale illustrating the cover 102 disposed upside-down with an example DASD configuration generally designated by the reference character 300 of the enclosure assembly 100 in accordance with a preferred embodiment. DASD configuration 300 includes a pair of hard disk drives (HDDs) 302 mounted to an inside surface 304 of the cover 102. A cover interposer card 306 is mechanically attached to the enclosure cover 102 with a plurality of fasteners 308 and aligned and electrically connected to each HDD 302 in the user selected DASD configuration 300. The cover interposer card 306 includes a predefined connection portion 310 with a positioning and alignment notch 312 mechanically and electrically connected with a mating electrical connector 506, for example, as illustrated and described with respect to FIGS. 5A, 5B, and 6. The mating corresponding latching features 320 project inwardly from opposite cover sides for receipt within the mating latching features 110 on the upper chassis ledge 108.

FIG. 4 is a perspective view not to scale illustrating the cover 102 disposed upside-down with another example configuration generally designated by the reference character 400 of the enclosure assembly 100 in accordance with a preferred embodiment. DASD configuration 400 includes a pair of solid state drives (SSDs) 402 mounted to the inside surface 304 of the cover 102. A cover interposer card 406 is mechanically attached to the enclosure cover with a plurality of fasteners 308 and aligned and electrically connected to each SSD 402 in the user selected DASD configuration 400.

Figure 5A:
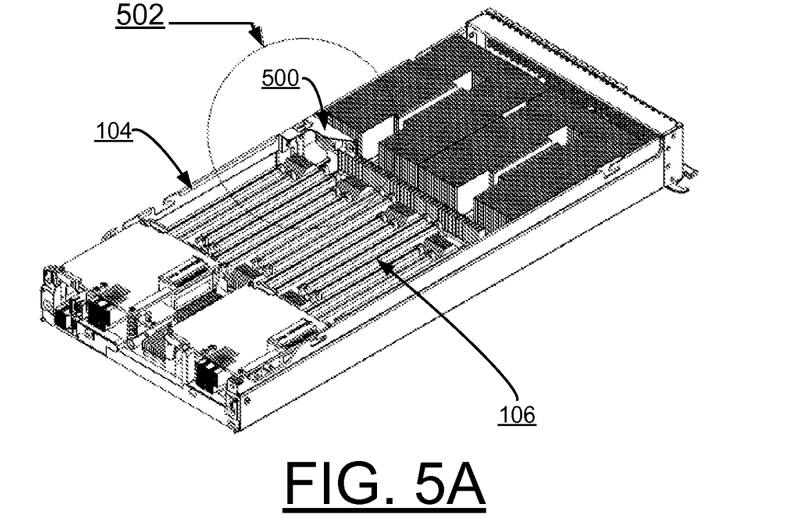
FIG. 5A is a perspective view not to scale illustrating the chassis and base planar of the enclosure assembly of FIG. 1 in accordance with the preferred embodiment.
Figure 5B:
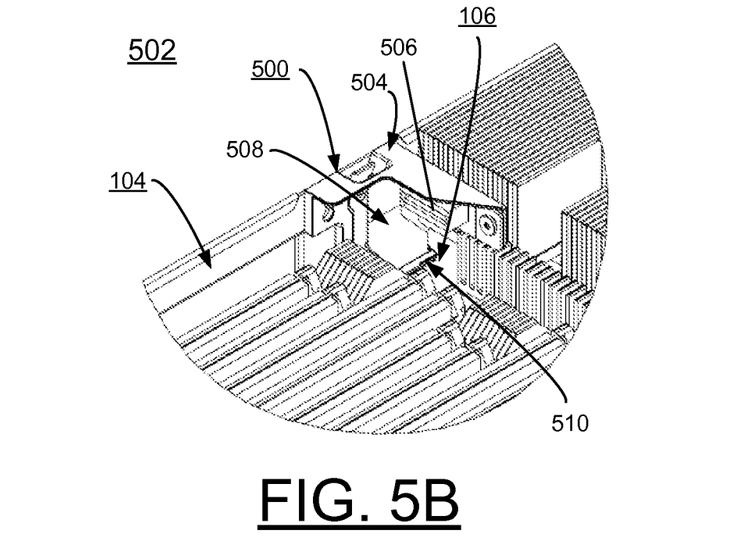
FIG. 5B is an enlarged detail perspective view not to scale illustrating the bracket assembly attached to the chassis and base planar of the enclosure assembly of FIG. 1 in accordance with the preferred embodiment.
Figure 6:
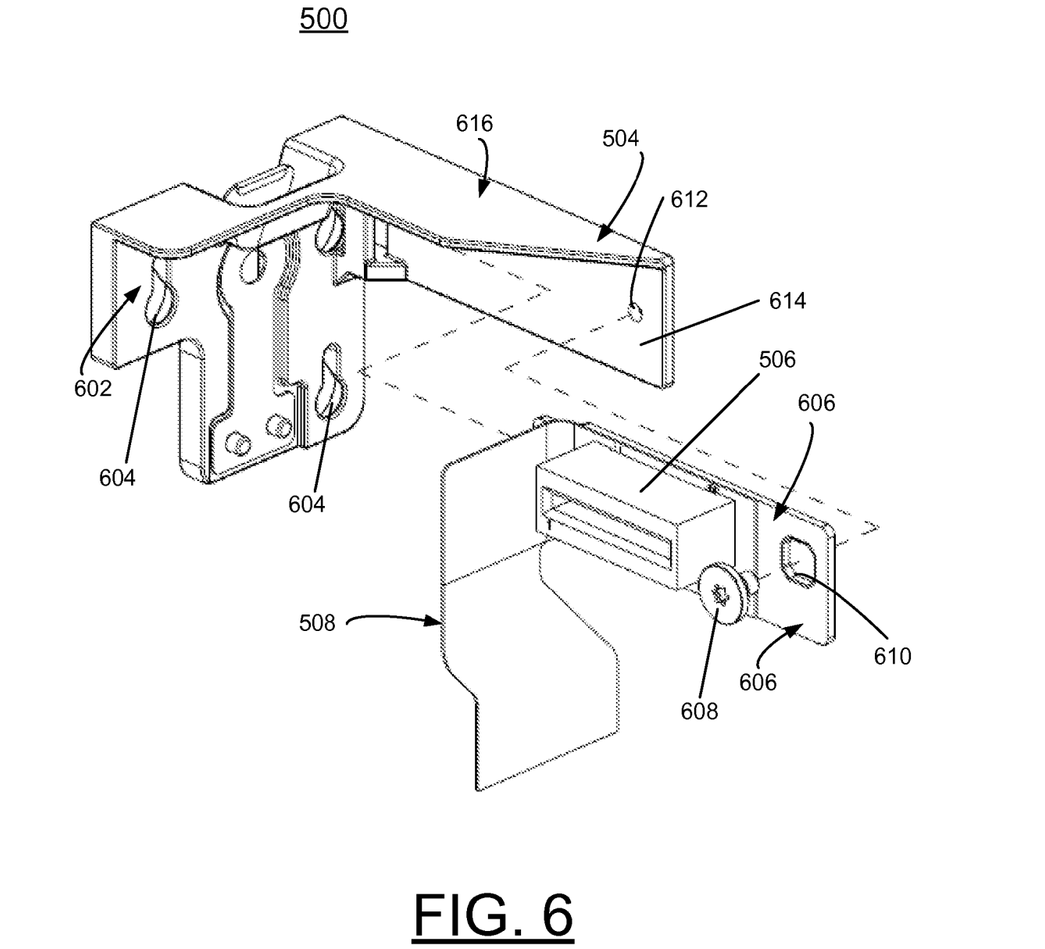
FIG. 6 is an enlarged detail perspective view not to scale illustrating the bracket assembly of FIGS. 5A and 5B of the enclosure assembly of FIG. 1 in accordance with the preferred embodiment.

The cover interposer card 406 similarly includes a predefined connection portion 310 with a positioning and alignment notch 312 for mechanical and electrical connection with the mating connector 506 shown in FIGS. 5A, 5B, and 6.

One common cover 102 having a predefined form factor is used with each of the multiple DASD configurations, such as the illustrated in the user selected DASD configurations 300, 400. The modularity of the one common cover 102 and chassis 104 of the enclosure assembly 100 requires only change in the mounting hardware for the selected DASD configuration 300 or 400 and the user sees no change in installation, alignment, or latching of the enclosure assembly. No tools are needed for cover installation or drive removal by the user.

Referring now to FIG. 5A, the enclosure assembly 100 includes a bracket assembly generally designated by the reference character 500 in accordance with the preferred embodiment as shown within a detail portion of the enclosure assembly 100 indicated by reference character 502. The bracket assembly 500 is attached to the chassis 104 and is arranged for electrically connecting the predefined connection portion 310 of the respective one of the cover interposer card 306 or the cover interposer card 406 with the base planar 106 of the enclosure assembly 100.

Referring also to FIG. 5B, the bracket assembly 500 includes a generally L-shaped bracket 504 and the mating electrical connector 506 connected by a flexible cable interconnect or flex cable 508 to a base planar connector 510. The mating electrical connector 506 is a card edge electrical connector providing electrical connection to the cover interposer card connection portion 310. The base planar connector 510 is a Zero Insertion Force (ZIF) connector connecting the planar card 106 to the flex cable 508. The bracket 504 is attached to the chassis 104 retaining and positioning the mating electrical connector 506 for mating engagement with the selected cover interposer card 306, 406 as the cover 102 is installed through a sliding motion with a chassis 104 and base planar 106 of the enclosure assembly 100.

In accordance with features of the invention, the electrical connector 506 together with the flex cable 508 is mounted to the chassis 104 via mechanical bracket assembly 500 to provide an auto-docking connection between the respective interposer card 306, 406 and base planar 106. The small mechanical bracket 500 mounting and positioning the card-edge connector 506 together with the flex cable 508, with the card-edge connector 506 mechanically and electrically connecting with the cover interposer card 306, 406 when the cover 102 is installed. The other end of the flex cable interconnect includes the zero-insertion force connector 510 connected to the base planar 106.

The auto-docking arrangement of the card edge electrical connector 506 and the cover interposer card 306, 406 enables the use of a small flex cable 508 to connect the cover interposer card to the base planar 106, without requiring pivoting or rotation of the cover. Alternative user connections typically would require a much longer cable length, which would introduce additional signal integrity and cable routing challenges. Serial attached SCSI (SAS) interface signals are routed from the user selected DASD configuration 300, 400 through the cover interposer card or drive interposer 306, 406, via connector 506 and flex cable 508, to the zero-insertion force connector 510 mounted on the base planar 106.

Referring also to FIG. 6, the bracket assembly 500 is shown in exploded perspective view. The bracket 504 is a stamped or formed member including a plurality of fastener-receiving holes 602 in a side portion 604 for attaching the bracket 504 to the chassis 104. The mating card edge electrical connector 506 together with the flex cable 508 carried by a bracket mounting member 606 is mounted to the bracket 504 by a fastener 608. The fastener 608 received through a bracket mounting member opening 610 secures the bracket mounting member 606 received in a corresponding opening 612 in a mating wall 614 of the bracket 504. An upper wall 616 of the bracket 504 also positions and retains the bracket mounting member 606 and electrical connector 506 with the bracket assembly 500.

Figure 7A:
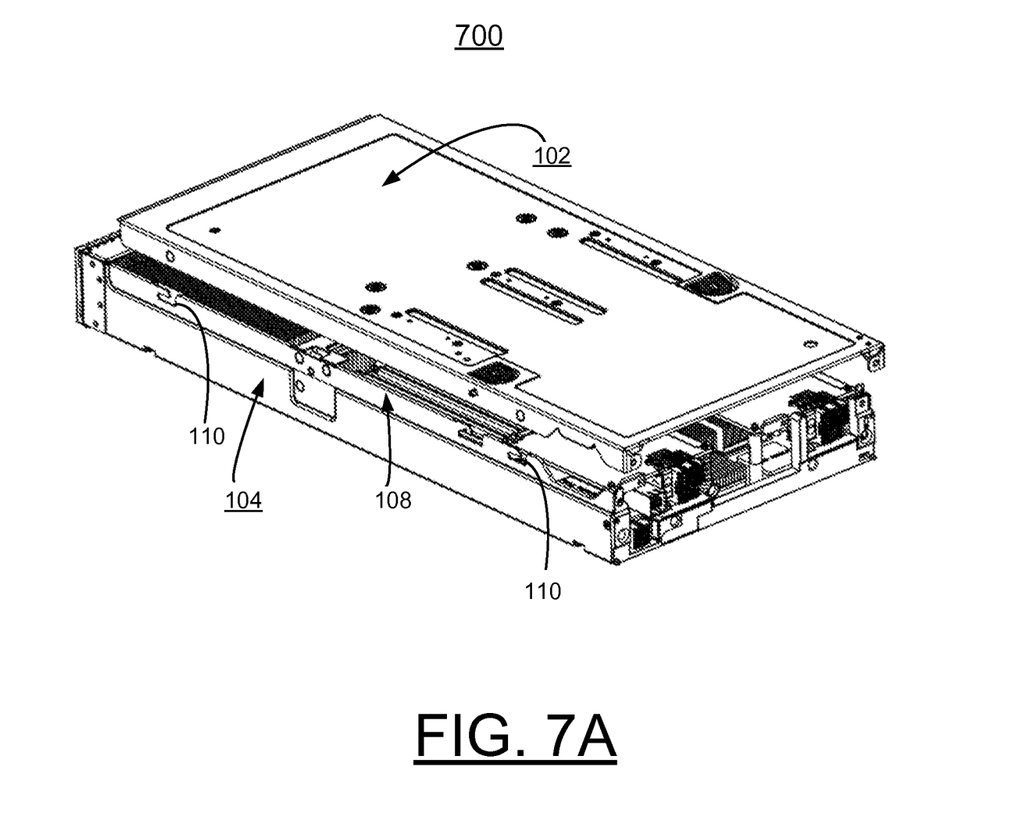
FIGS. 7A and 7B are respective perspective views not to scale illustrating example steps of the cover installation process before the cover is pushed forward to mate the cover interposer card and flex cable assembly of the chassis and base planar of the enclosure assembly of FIG. 1 in accordance with the preferred embodiment.
Figure 7B:
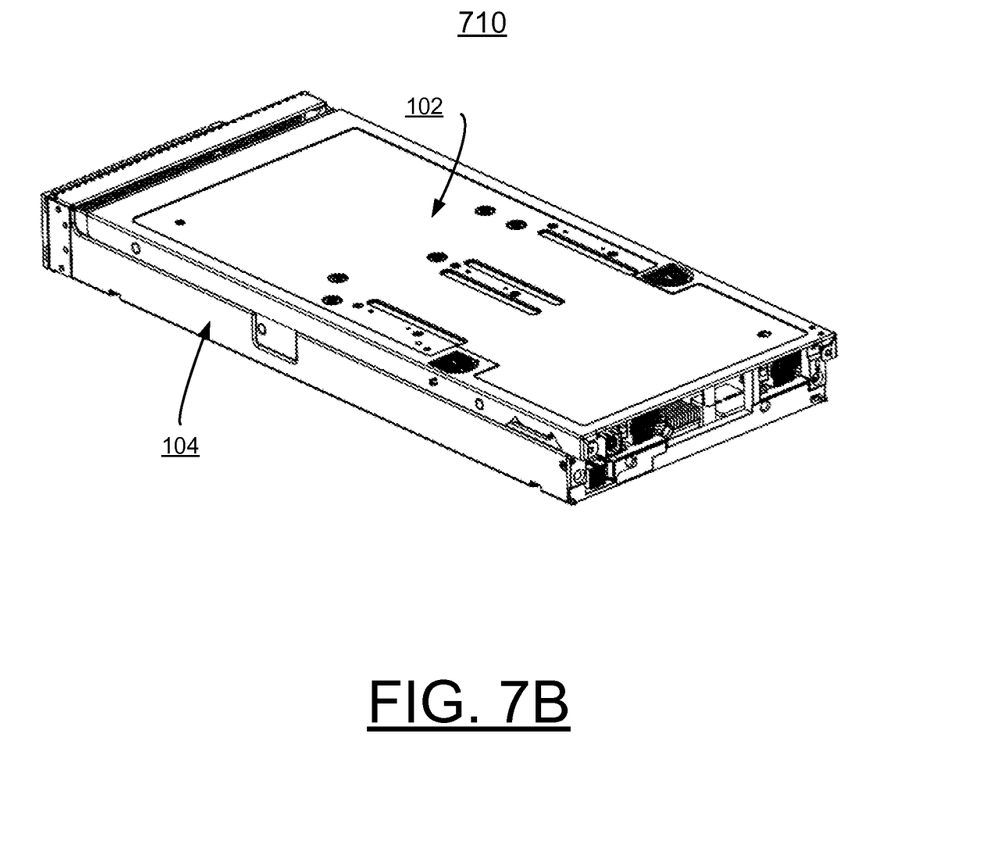

Referring to FIGS. 7A and 7B, there are shown example steps of the cover installation process generally designated by the reference characters 700, 710 to the chassis 104 and base planar 106 of the enclosure assembly 100 in accordance with the preferred embodiment. The cover installation steps 700, 710 are performed before the cover 102 is pushed forward to mate the cover interposer card 306, 406 and mating card edge electrical connector 506.

In the cover installation step 700 shown in FIG. 7A, the cover 102 is positioned above, separated from the chassis 104.

In the cover installation step 710 shown in FIG. 7B, the cover 102 is moved onto the upper cover mounting ledge portion 108 of the chassis 104, before moving the cover 102 forward, where the cover 102 and chassis 104 will be assembled together in the enclosure assembly 100.

Figure 8A:
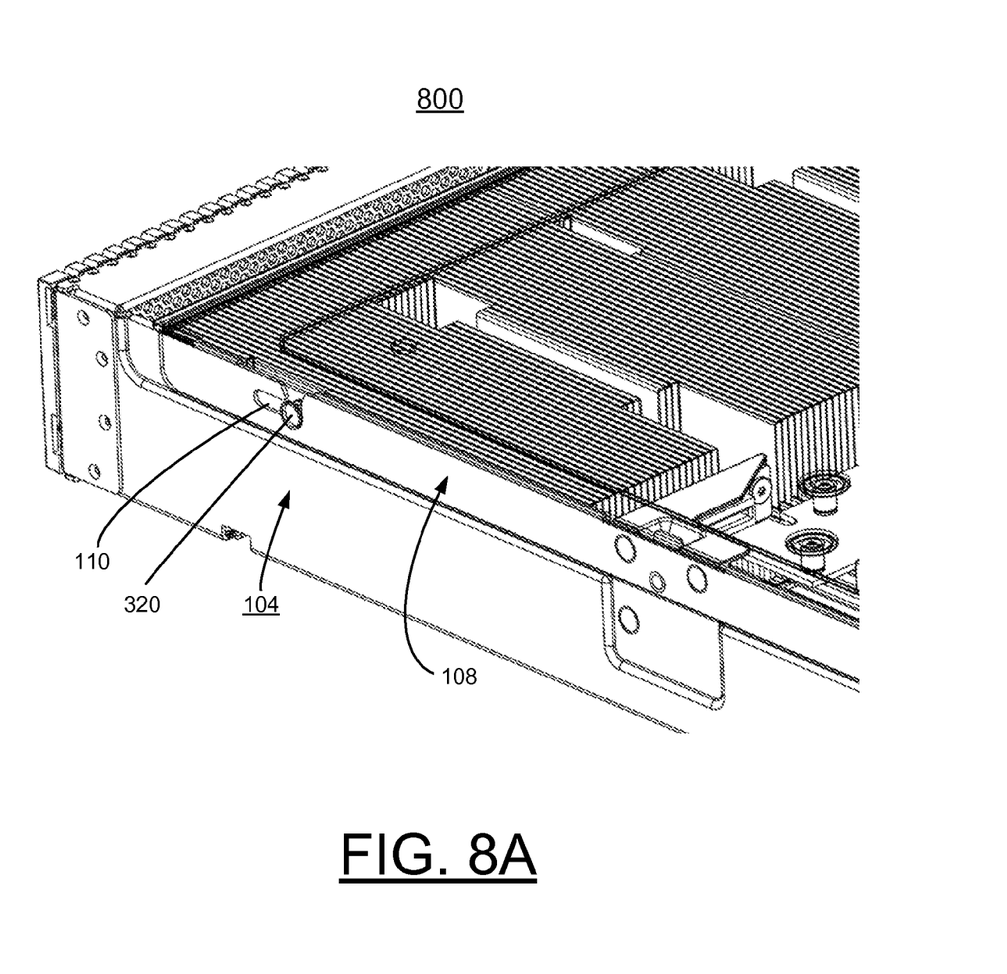
FIGS. 8A and 8B are respective perspective views not to scale illustrating example steps of the cover installation process with the cover shown as transparent to highlight the detail of the invention and respective illustrating detail of the cover as it is set down on the ITE chassis cover channels, and shows detail of the cover after it pushed forward in the ITE chassis cover channels and the cover interposer card and connector mate in the enclosure assembly of FIG. 1 in accordance with the preferred embodiment.
Figure 8B:
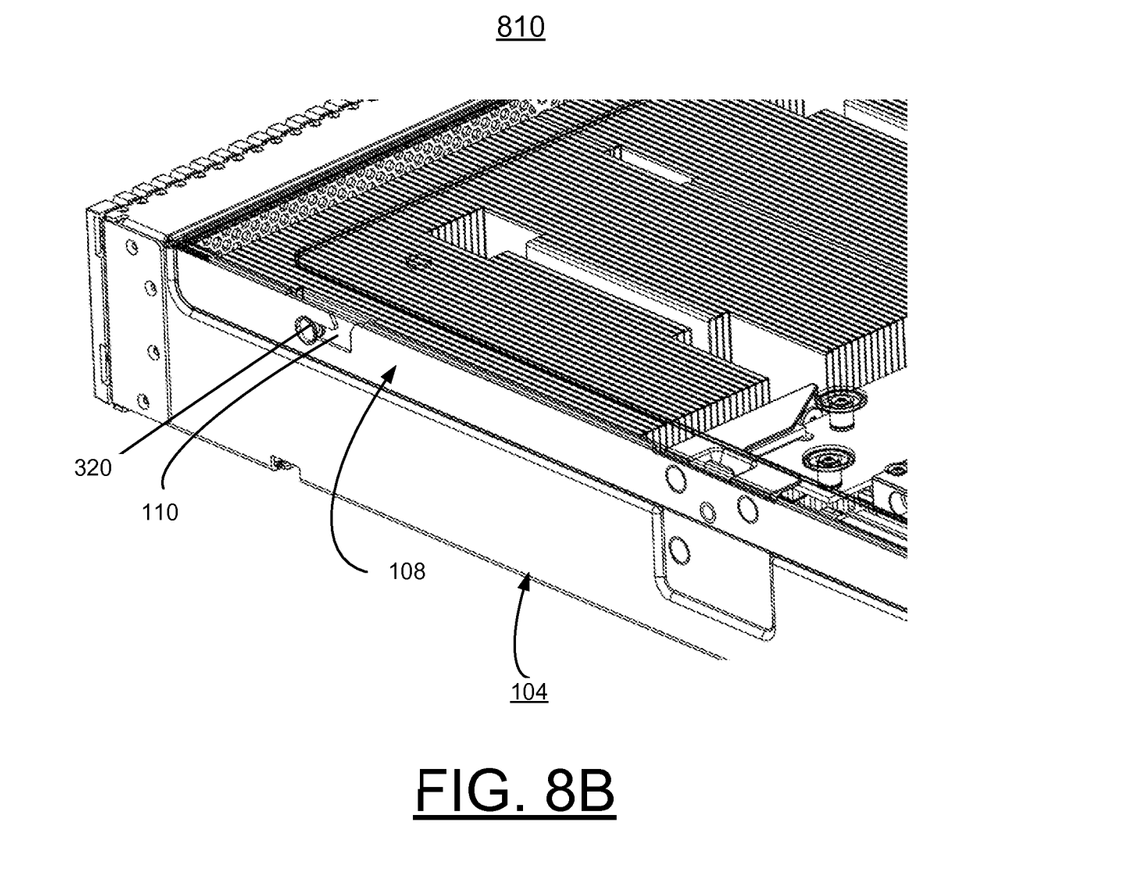

Referring to FIGS. 8A and 8B, there are shown example steps of the cover installation process generally designated by the reference characters 800, 810 to the chassis 104 and base planar 106 with the cover shown as transparent to highlight the detail of the invention of the enclosure assembly 100 in accordance with the preferred embodiment. FIG. 8A shows an example installation step 800 showing latching detail of the cooperating latching feature 320 of cover 102 and latching feature 110 of the chassis 104 when the enclosure cover 102 is set down on the ITE chassis 104. FIG. 8B shows an example installation step 810 showing latching detail of the cooperating latching feature 320 of cover 102 and latching feature 110 of the chassis 104 after the cover 102 is pushed forward in the ITE chassis 104. At step 810, the cover interposer card 306, 406 and connector 506 mate in the enclosure assembly 100 in accordance with the preferred embodiment, as illustrated in FIG. 9B.

Figure 9A:
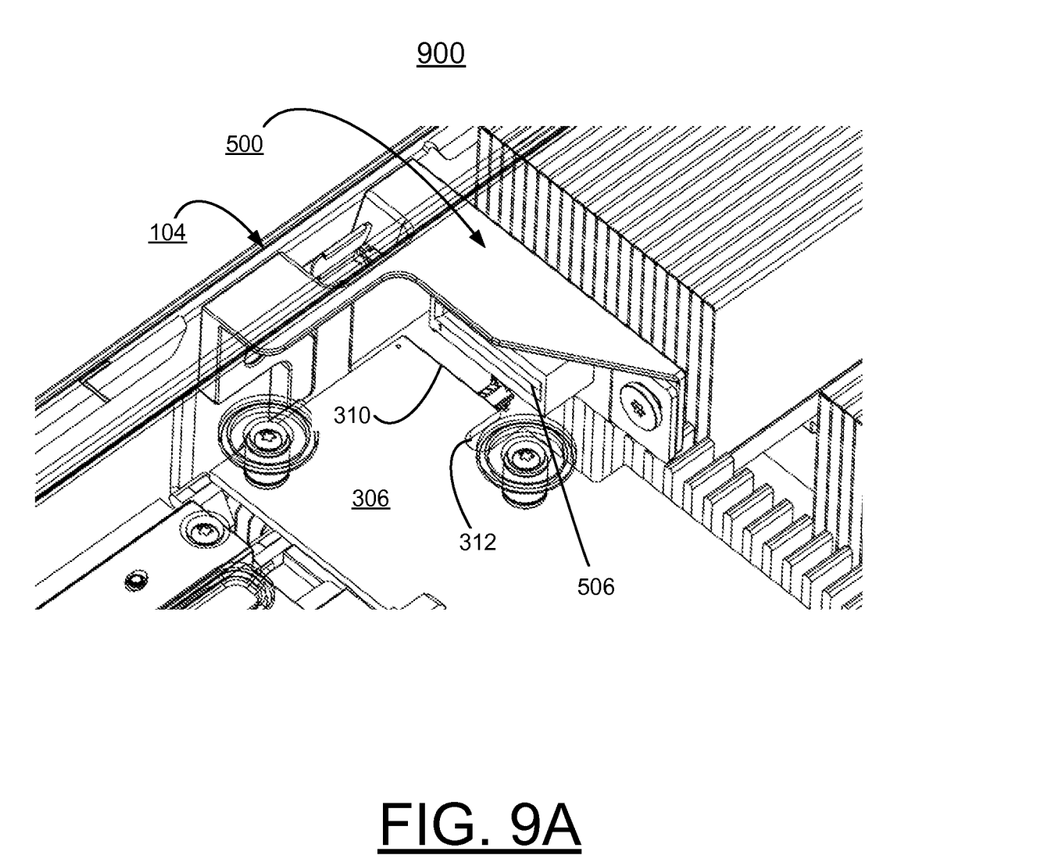
FIGS. 9A and 9B are respective perspective views not to scale illustrating further detail of the connector and interposer card mating through the cover installation process with the cover shown as transparent to highlight the detail of the invention in the enclosure assembly of FIG. 1 in accordance with the preferred embodiment.
Figure 9B:
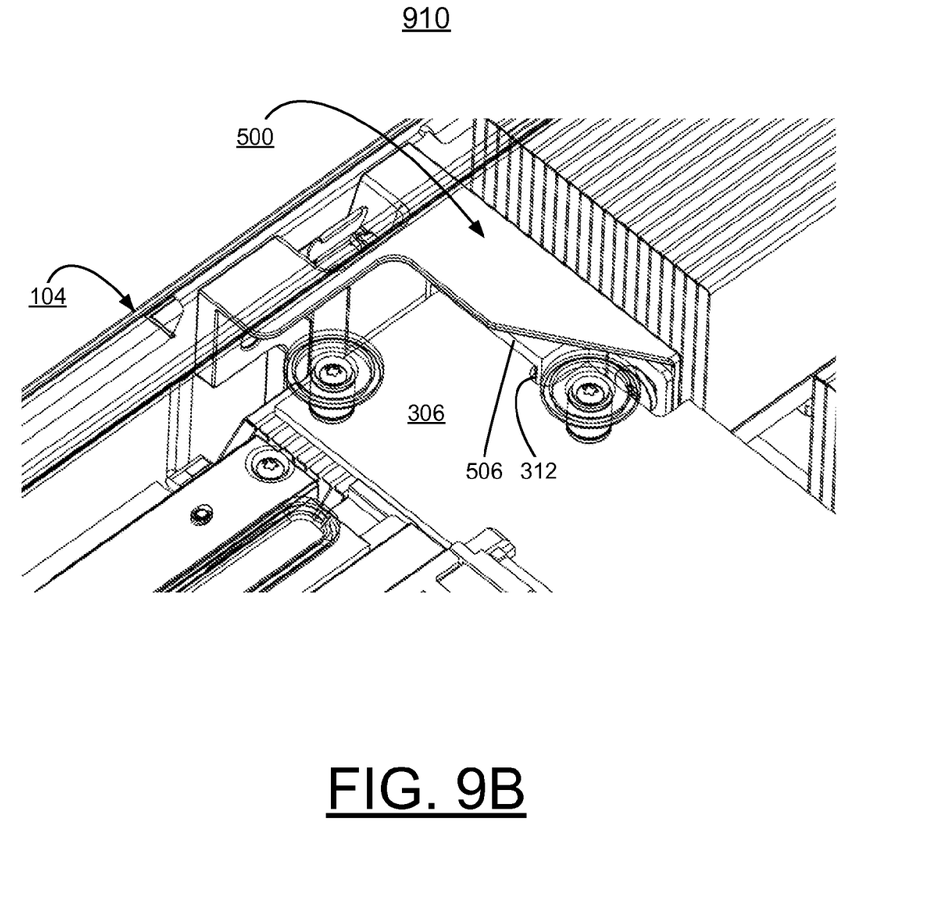

Referring to FIGS. 9A and 9B, there are shown example steps of the cover installation process generally designated by the reference characters 900, 910 to the chassis 104 and base planar 106 with the cover shown as transparent to highlight the detail of the invention in the enclosure assembly 100 in accordance with the preferred embodiment. FIG. 9A shows an example installation step 900 showing the auto-docking detail of the cooperating mating predefined portion 310, of the selected cover interposer card 306, 406 carried by the cover 102 and mating electrical connector 506 of the chassis 104 when the enclosure cover 102 is set down on the ITE chassis 104. FIG. 9B shows an example installation step 910 showing auto-docking detail of the cooperating mating predefined portion 310, of the selected cover interposer card 306, 406 carried by the cover 102 and mating electrical connector 506 provided in mating engagement after the cover 102 is pushed forward in the ITE chassis 104. The electrical connector 506 mates with the predefined portion 310, of the selected cover interposer card 306, 406 as the cover 102 is installed through a sliding motion with a chassis 104 and base planar 106 of the enclosure assembly 100.

Figure 10A:
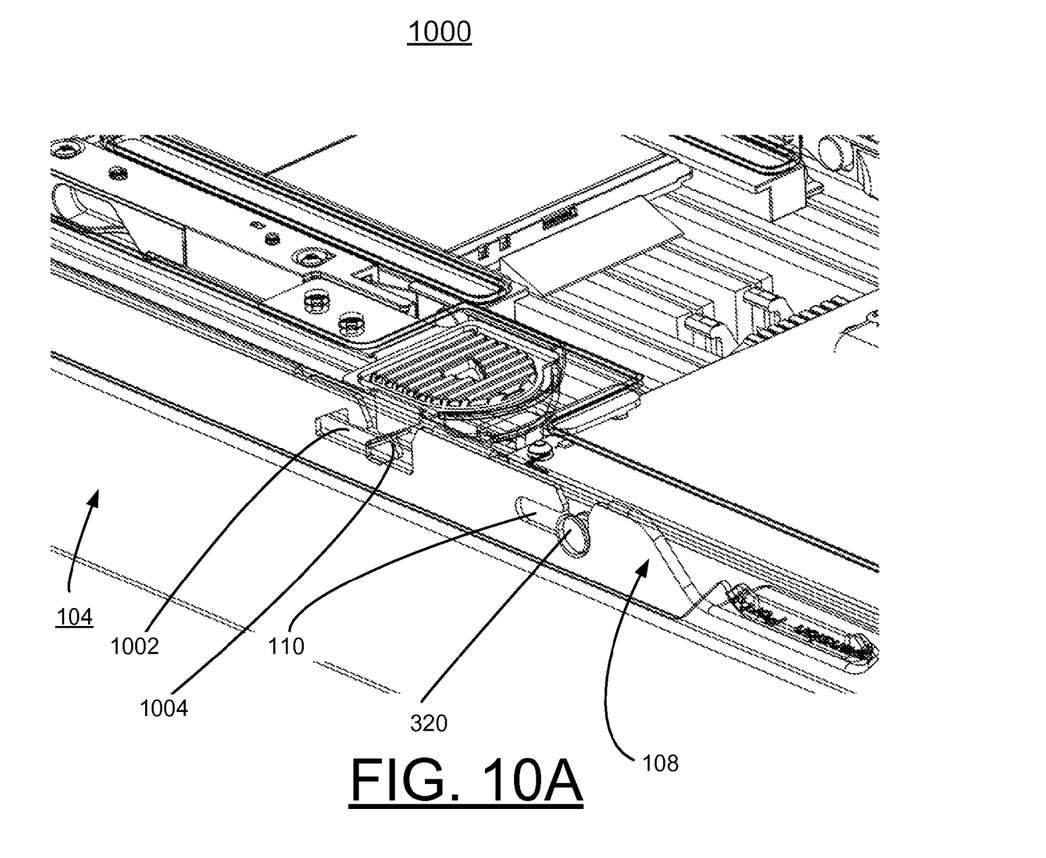
FIGS. 10A and 10B are respective perspective views not to scale illustrating further detail of the cover installation and latching mechanism through the cover installation process with the cover shown as transparent to highlight the detail of the invention in the enclosure assembly of FIG. 1 in accordance with the preferred embodiment.
Figure 10B:
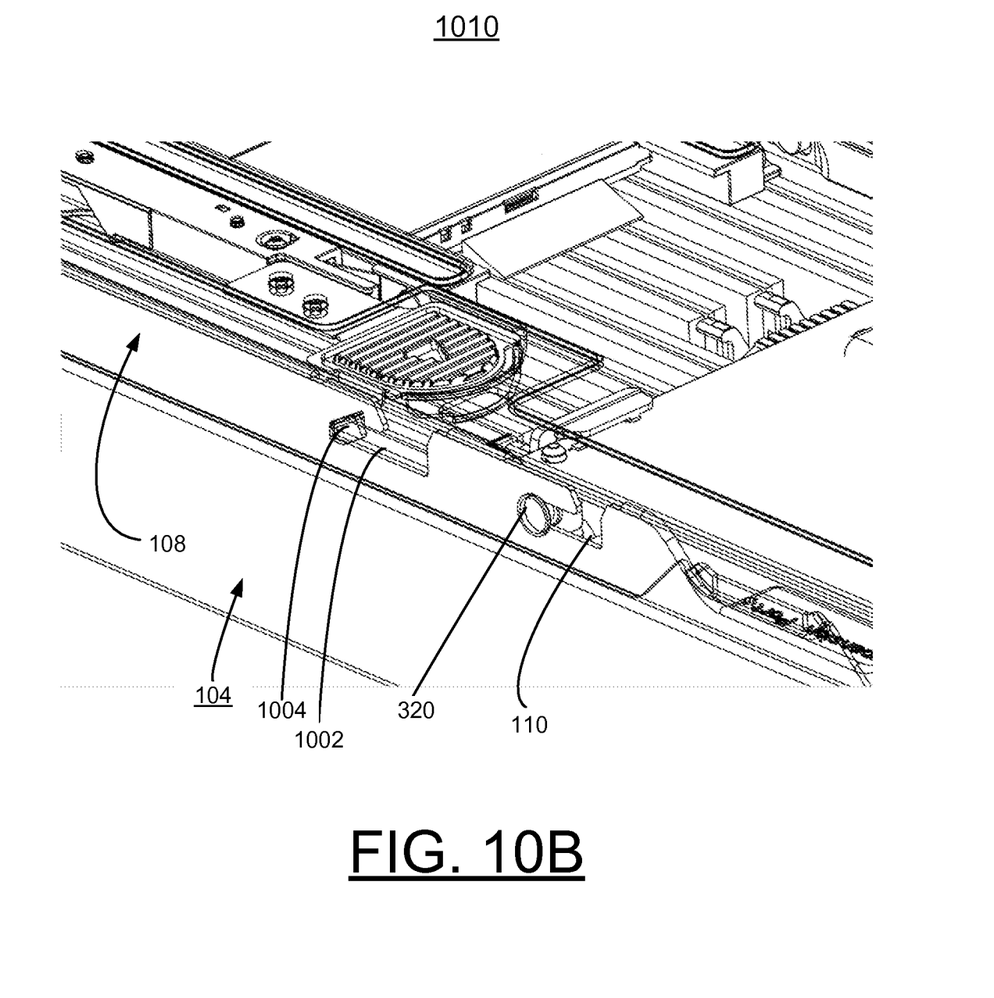

Referring to FIGS. 10A and 10B, there are shown example steps of the cover installation process generally designated by the reference characters 1000, 1010 to the chassis 104 and base planar 106 of the enclosure assembly 100 in accordance with the preferred embodiment. FIG. 10A shows an example installation step 1000 showing another latching detail of the cooperating latching feature 320 of cover 102 and latching feature 110 of the chassis 104 and additional latching features including cooperating latching feature 1002 of cover 102 and latching feature 1004 when the enclosure cover 102 is set down on the ITE chassis 104. FIG. 10B shows an example installation step 1010 showing the latching detail of the cooperating latching feature 320 and latching feature 110 and the additional cooperating latching features 1002 and latching feature 1004 after the cover 102 is pushed forward in the ITE chassis 104.

While the present invention has been described with reference to the details of the embodiments of the invention shown in the drawing, these details are not intended to limit the scope of the invention as claimed in the appended claims.

What is claimed is:

1. An enclosure assembly for information technology equipment comprising: a chassis;
   a base planar carried by said chassis;
   an enclosure cover; said chassis including an upper ledge for sliding engagement with said enclosure cover in the enclosure assembly;
   a user selected direct access storage device (DASD) configuration being mechanically attached to said enclosure cover extending inside the enclosure assembly separated from said base planar;
   a cover interposer card mechanically attached to said enclosure cover extending inside the enclosure assembly adjacent to said user selected DASD configuration and electrically connected to each DASD in said user selected DASD configuration;
   an electrical connector mating with said cover interposer card; said electrical connector and said cover interposer card being electrically connected responsive to said enclosure cover being installed on said chassis through a sliding motion;
   a flexible cable interconnect being attached to said electrical connector; said flexible cable interconnect being connected to said base planar and having a minimized length;
   said enclosure cover and said chassis being configured for installation in the enclosure assembly without requiring tools; and
   the enclosure assembly requiring only a different mounting hardware for said user selected DASD configuration.

2. The enclosure assembly as recited in claim 1 wherein said enclosure cover and said upper ledge of said chassis include cooperating latching features.

3. The enclosure assembly as recited in claim 1 wherein said flexible cable interconnect includes a zero-insertion force connector connected to said base planar.

4. The enclosure assembly as recited in claim 1 wherein said electrical connector include a card-edge electrical connector and said cover interposer card includes a predefined connection portion with a positioning and alignment notch mechanically and electrically connected with said card-edge electrical connector.

5. The enclosure assembly as recited in claim 1 wherein said enclosure cover being installed on said chassis through a sliding motion without pivoting or rotation of said enclosure cover.

6. The enclosure assembly as recited in claim 1 wherein said user selected DASD configuration includes at least one hard disk drive (HDD).

7. The enclosure assembly as recited in claim 1 wherein said user selected DASD configuration includes at least one solid state drive (SSD).

8. The enclosure assembly as recited in claim 1 includes a bracket assembly mounting and positioning said electrical connector for mating with said cover interposer card.

9. The enclosure assembly as recited in claim 8 wherein said bracket assembly supports and positions said flexible cable interconnect.

10. The enclosure assembly as recited in claim 1 wherein said enclosure cover has a predefined form factor.

11. The enclosure assembly as recited in claim 1 wherein said enclosure cover has identical latching and alignment features used with each said user selected DASD configuration.

12. The enclosure assembly as recited in claim 1 wherein said chassis and said enclosure cover include a predefined size.

13. The enclosure assembly as recited in claim 1 wherein said chassis upper ledge includes a plurality of mating latching features for mating latching engagement with corresponding latching features of said enclosure cover.

14. A server system for implementing cover-mounted and auto-docking for multiple direct access storage device (DASD) configurations comprising:
    a chassis;
    a base planar carried by said chassis;
    an enclosure cover; said chassis including an upper ledge for sliding engagement with said enclosure cover in an enclosure assembly of the server system;
    a user selected DASD configuration being mechanically attached to said enclosure cover extending inside the enclosure assembly separated from said base planar;
    a cover interposer card mechanically attached to said enclosure cover and electrically connected to each DASD in said user selected DASD configuration extending inside the enclosure assembly adjacent to said user selected DASD configuration;
    an electrical connector mating with said cover interposer card; said electrical connector and said cover interposer card being electrically connected responsive to said enclosure cover being installed on said chassis through a sliding motion;
    a flexible cable interconnect being attached to said electrical connector; said flexible cable interconnect being connected to said base planar and having a minimized length;
    said enclosure cover and said chassis being configured for installation in the enclosure assembly without requiring tools; and
    the enclosure assembly requiring only a different mounting hardware for said user selected DASD configuration.

15. The server system as recited in claim 14 wherein said electrical connector include a card-edge electrical connector and said cover interposer card includes a predefined connection portion with a positioning and alignment notch mechanically and electrically connected with said card-edge electrical connector.

16. The server system as recited in claim 14 wherein said chassis and said enclosure cover include a predefined size.

17. The server system as recited in claim 14 wherein said chassis upper ledge includes a plurality of mating latching features for mating latching engagement with corresponding latching features of said enclosure cover.

18. The server system as recited in claim 14 wherein said enclosure cover being installed on said chassis through a sliding motion without pivoting or rotation of said enclosure cover.

19. The server system as recited in claim 14 includes a bracket assembly mounting and positioning said electrical connector for mating with said cover interposer card; said bracket assembly supports and positions said flexible cable interconnect.

20. The server system as recited in claim 14 wherein said enclosure cover has identical latching and alignment features used with each said user selected DASD configuration.

* * * * *